(12) United States Patent
Strong et al.

(10) Patent No.: US 10,467,194 B2
(45) Date of Patent: Nov. 5, 2019

(54) MULTI-DEVICE UPLOAD INTEGRATION APPLICATION

(71) Applicant: SMUGMUG, INC., Mountain View, CA (US)

(72) Inventors: Brian Strong, San Jose, CA (US); Don MacAskill, Los Altos, CA (US)

(73) Assignee: SMUGMUG, INC., Mountain View, CA (US)

( * ) Notice: Subject to any disclaimer, the term of this patent is extended or adjusted under 35 U.S.C. 154(b) by 379 days.

(21) Appl. No.: 15/270,112

(22) Filed: Sep. 20, 2016

(65) Prior Publication Data

US 2017/0083534 A1  Mar. 23, 2017

Related U.S. Application Data

(60) Provisional application No. 62/222,648, filed on Sep. 23, 2015.

(51) Int. Cl.
| | |
|---|---|
| *G06F 3/0484* | (2013.01) |
| *G06F 16/16* | (2019.01) |
| *H04L 29/08* | (2006.01) |
| *H04L 29/06* | (2006.01) |
| *G06F 16/13* | (2019.01) |

(52) U.S. Cl.
CPC ............ *G06F 16/168* (2019.01); *G06F 16/13* (2019.01); *H04L 63/12* (2013.01); *H04L 63/168* (2013.01); *H04L 67/025* (2013.01); *H04L 67/02* (2013.01); *H04L 67/1097* (2013.01)

(58) Field of Classification Search
CPC ............ G06F 17/30126; G06F 3/0484; H04L 63/0838
See application file for complete search history.

(56) References Cited

U.S. PATENT DOCUMENTS

| | | | |
|---|---|---|---|
| 9,195,843 B2 * | 11/2015 | MacAskill | .......... G06F 21/6209 |
| 10,057,227 B1 * | 8/2018 | Hess | ........................ H04L 63/08 |
| 2002/0184318 A1 | 12/2002 | Pineau | |
| 2005/0210101 A1 | 9/2005 | Janik | |

(Continued)

OTHER PUBLICATIONS

Dave Weiss, "Pro tips: Become a master of file requests," Sep. 18, 2015, retrieved from https://blogs.dropbox.com/dropbox/2015/09/pro-tips-become-a-master-of-file-requests/, pp. 1-3. (Year: 2015).*

(Continued)

*Primary Examiner* — Dino Kujundzic (74) *Attorney, Agent, or Firm* — Patterson + Sheridan, LLP (57) ABSTRACT

Embodiments described herein generally relate to a software application platform which provides a user with the ability to upload media items to a first file storage location from a remote second file location. The media items may be uploaded from the remote second file location via an internet connection. The user may send a link via a data network that allows the user to quickly log in and upload media items via the remote device which receives the link. Each link may authenticate the user and launch the correct application on the remote device for uploading the media items after the link is selected. As such, the user may upload media items via the remote device to the first file location via the link, without a coupling between the second file location coupled with the remote device and the first file location.

18 Claims, 9 Drawing Sheets

(56) References Cited

U.S. PATENT DOCUMENTS

| | | | |
|---|---|---|---|
| 2007/0266257 A1* | 11/2007 | Camaisa | H04L 63/0838 713/182 |
| 2010/0146073 A1 | 6/2010 | Dittmar et al. | |
| 2010/0154038 A1 | 6/2010 | Natarajan | |
| 2010/0222085 A1* | 9/2010 | El Bedraoui | H04L 51/38 455/466 |
| 2013/0054760 A1 | 2/2013 | Bae et al. | |
| 2013/0246558 A1 | 9/2013 | Bacastow | |
| 2014/0259190 A1* | 9/2014 | Kiang | G06F 21/6218 726/30 |
| 2015/0249709 A1 | 9/2015 | Teng et al. | |
| 2015/0334108 A1* | 11/2015 | Khalil | G06F 21/31 726/8 |
| 2016/0072806 A1* | 3/2016 | Kim | H04L 41/0806 726/5 |
| 2016/0219027 A1* | 7/2016 | Kaplan | H04L 63/08 |

OTHER PUBLICATIONS

Valerie Sarnataro, "What is Two-Step Verification? How Do You Set it Up?" published on Apr. 18, 2013, TechnologyGuide.com, available at http://www.technologyguide.com/feature/two-step-verification-why-you-should-be-using-it/ , pp. 1-2. (Year: 2013).*

International Search Report and Written Opinion of related application PCT/US 16/52953 dated Dec. 15, 2016.

* cited by examiner

MULTI-DEVICE UPLOAD INTEGRATION APPLICATION

CROSS-REFERENCE TO RELATED APPLICATIONS

This application claims priority to U.S. Provisional Patent Application No. 62/222,648, filed Sep. 23, 2015, the entirety of which is herein incorporated by reference.

BACKGROUND

Field

Embodiments of the present disclosure generally relate to the field of computer software. More specifically, embodiments provided herein relate to a system and method for generating and delivering access to a file storage location to and/or from multiple devices.

Description of the Related Art

The production and availability of information and media has gained prevalence in today's society. The ability to instantly access and share information, experiences, news, photos, and videos over the internet and on mobile devices has revolutionized the way people connect, learn, consume information, and participate in today's society.

In recent years, the popularity of business and personal web pages that are hosted by web service providers has increased. Examples of such web pages include profile pages on social network websites, blog web pages, online photo galleries, and the like. There exists a strong connection between a user and their web pages that has lead web page service providers to enable their customers to customize the look and feel of their web pages. For example, some web service providers allow web page users to upload photos that are displayed on their personal web pages, and/or allow web page users to edit the font size and typeface displayed on their web pages. Many web service providers further enable web page users to create a sharable photo gallery online. One popular approach to creating or adding photos to web pages is allowing the user to upload files or images stored on the device from which they are currently accessing the web page. Oftentimes, however, the files or images the user desires to upload to their web page are not stored on the device in which they are currently accessing the web page. In fact, the desired files may be stored on multiple devices, such as smart phones, tablets, personal computers, laptop computers, etc. As such, a problem exists with allowing the user to access the desired files from multiple devices and upload them to the desired web page.

As the foregoing illustrates, there is a need for improved techniques for generating and delivering access to a file location from multiple devices. More specifically, what is needed in the art is a multi-device upload integration application.

SUMMARY

The present disclosure generally relates to a software application platform which provides a user with the ability to upload media items to a first file storage location from a remote second file location. The media items may be uploaded from the remote second file location via an internet connection such that the remote device storing the media items is generally not communicatively coupled to the first file location. The user may send a link via a data network that allows the user to quickly log in and upload media items via the remote device which receives the link. Each link may authenticate the user and launch the correct application on the remote device for uploading the media items after the link is selected. As such, the user may upload media items via the remote device to the first file location via the link, without a coupling between the second file location coupled with the remote device and the first file location.

In one embodiment, a method for generating and delivering access to a first file storage location from multiple devices is disclosed. The method includes receiving a request on a server via a first graphical user interface to access the first file storage location via a second graphical user interface and receiving an input on the server via the first graphical user interface. The input may determine a unique identification protocol associated with the second graphical user interface and the second graphical user interface may be configured to access the first file storage location. The method further includes generating a link to the first file storage location, sending the link to the second graphical user interface via a data network, and receiving a request to access the first file storage location via the link displayed on the second graphical user interface. The method also includes transferring a media item from a second file storage location accessed via the second graphical user interface to the first file storage location, and displaying the media item stored within the first file storage location.

In another embodiment, a computer system for generating and delivering access to a first file storage location from multiple devices is disclosed. The computer system includes a processor and a memory. The memory stores instructions that, when executed by the processor, cause the computer system to receive a request on a server via a first graphical user interface to access the first file storage location via a second graphical user interface, receive an input on the server via the first graphical user interface, and generate a link to the first file storage location. The input determines a unique identification protocol associated with the second graphical user interface. The second graphical user interface is configured to access the first file storage location. The computer system may also send the link to the second graphical user interface via a data network and receive a request to access the first file storage location via the link displayed on the second graphical user interface. A media item may be transferred from a second file storage location accessed via the second graphical user interface to the first file storage location and display the media item stored within the first file storage location.

In yet another embodiment, a non-transitory computer-readable medium storing instructions that, when executed by a processor, cause a computer system to generate and deliver access to a first file storage location from multiple devices is disclosed. The processor may perform the steps of receiving a request on a server via a first graphical user interface to access the first file storage location via a second graphical user interface and receiving an input on the server via the first graphical user interface, wherein the input determines a unique identification protocol associated with the second graphical user interface, the second graphical user interface configured to access the first file storage location. The processor may further perform the steps of generating a link to the first file storage location, sending the link to the second graphical user interface via a data network, and receiving a request to access the first file storage location via the link displayed on the second graphical user interface. A media item may be transferred from a second file storage location accessed via the second graphical user interface to the first file storage location. The media item stored within the first file storage location may be enabled for viewing.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein generally relate to a software application platform which provides a user with the ability to upload media items to a first file storage location from a remote second file location. The media items may be uploaded from the remote second file location via an internet connection such that the remote device storing the media items is generally not communicatively coupled to the first file location. The user may send a link via a data network that allows the user to quickly log in and upload media items via the remote device which receives the link. Each link may authenticate the user and launch the correct application on the remote device for uploading the media items after the link is selected. As such, the user may upload media items via the remote device to the first file location via the link, without a coupling between the second file location coupled with the remote device and the first file location.

The term "user" as used herein includes, for example, a person or entity that owns a computing device or wireless device; a person or entity that operates or utilizes a computing device or a wireless device; or a person or entity that is otherwise associated with a computing device or a wireless device. It is contemplated that the term "user" is not intended to be limiting and may include various examples beyond those described.

The term "media item" as used herein includes, for example, computer files, data, images, photos, documents, other such electronic media, and other resources for storing information, which is available to a computer program and which may be based on some type of durable storage. A file is durable in that it generally remains available for other programs or applications to use after the program or application that created it has finished executing.

Figure 1:
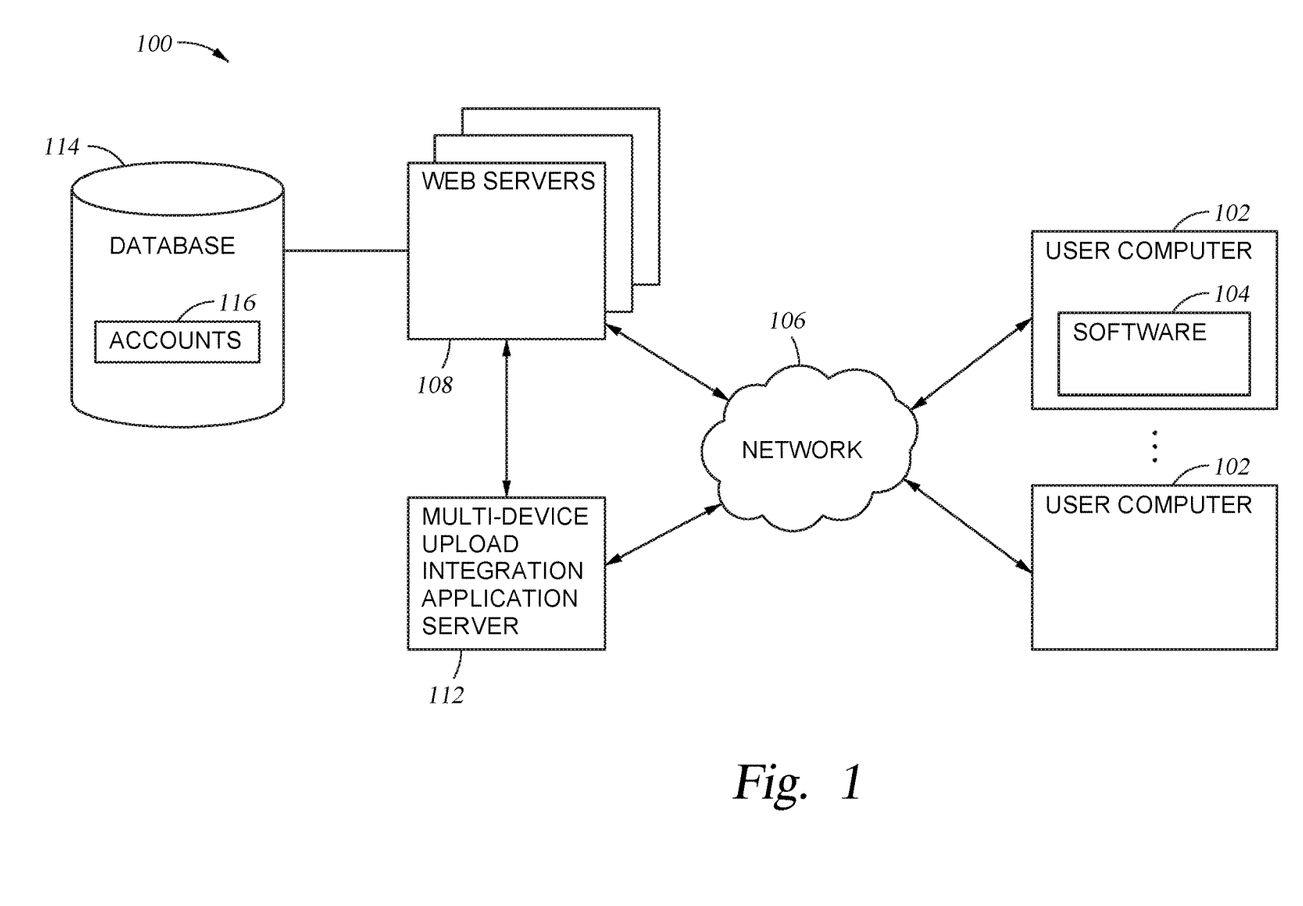
FIG. 1 illustrates a computer system configured for providing a website having a multi-device upload integration application, according to embodiments described herein.

FIG. 1 illustrates a computing system 100 configured for providing a multi-device upload integration application in which embodiments of the disclosure may be practiced. As shown, the computing system 100 may include a plurality of web servers 108, a multi-device upload integration application server 112, and a plurality of user computers (i.e., mobile/wireless devices) 102 (only two of which are shown for clarity), each connected to a communications network 106 (for example, the Internet). The web servers 108 may communicate with the database 114 via a local connection (for example, a Storage Area Network (SAN) or Network Attached Storage (NAS)) or over the Internet (for example, a cloud based storage service). The web servers 108 are configured to either directly access data included in the database 114 or to interface with a database manager that is configured to manage data included within the database 114. An account 116 is a data object that stores data associated with a user, such as the user's email address, password, contact information, billing information, photo subject displays for his or her personal web page(s), and the like.

Each user computer 102 may include conventional components of a computing device, for example, a processor, system memory, a hard disk drive, a battery, input devices such as a mouse and a keyboard, and/or output devices such as a monitor or graphical user interface, and/or a combination input/output device such as a touchscreen which not only receives input but also displays output. Each web server 108 and the multi-device upload integration application server 112 may include a processor and a system memory (not shown), and may be configured to manage content stored in database 114 using, for example, relational database software and/or a file system. The web servers 108 may be programmed to communicate with one another, user computers 102, and the multi-device upload integration application server 112 using a network protocol such as, for example, the TCP/IP protocol. The multi-device upload integration application server 112 may communicate directly with the user computers 102 through the communications network 106. The user computers 102 are programmed to execute software 104, such as web browser programs and other software applications, and access web pages and/or applications managed by web servers 108 by specifying a uniform resource locator (URL) that directs to web servers 108.

In the embodiments described below, users are respectively operating the user computers 102 that are connected to the web servers 108 over the communications network 106. Web pages are displayed to a user via the user computers 102. The web pages are transmitted from the web servers 108 to the user's computer 102 and processed by the web browser program stored in that user's computer 102 for display through a display device and/or a graphical user interface in communication with the user's computer 102.

In one example, images displayed on the user's computer 102 may be a digital photograph accessed via an online photo gallery. The user's computer 102 may access the online photo gallery via the communications network 106 which, in turn, retrieves the online photo gallery from the web servers 108 connected to the database 114 and causes the images to be displayed through a graphical user interface of the user's computer 102. The online photo gallery may be managed with a username and password combination, or other similar restricted access/verification required access methods, which allow the user to "log in" and access the images.

It is noted that the user computer 102 may be a personal computer, laptop mobile computing device, smart phone, video game console, home digital media player, network-connected television, set top box, and/or other computing devices having components suitable for communicating with the communications network 106. The user computer 102 may also execute other software applications configured to receive, display, modify, store, and upload media files and other data from the multi-device integration application, such as, but not limited to, text notifications, SMS data, email platforms and other application platforms.

Figure 2:
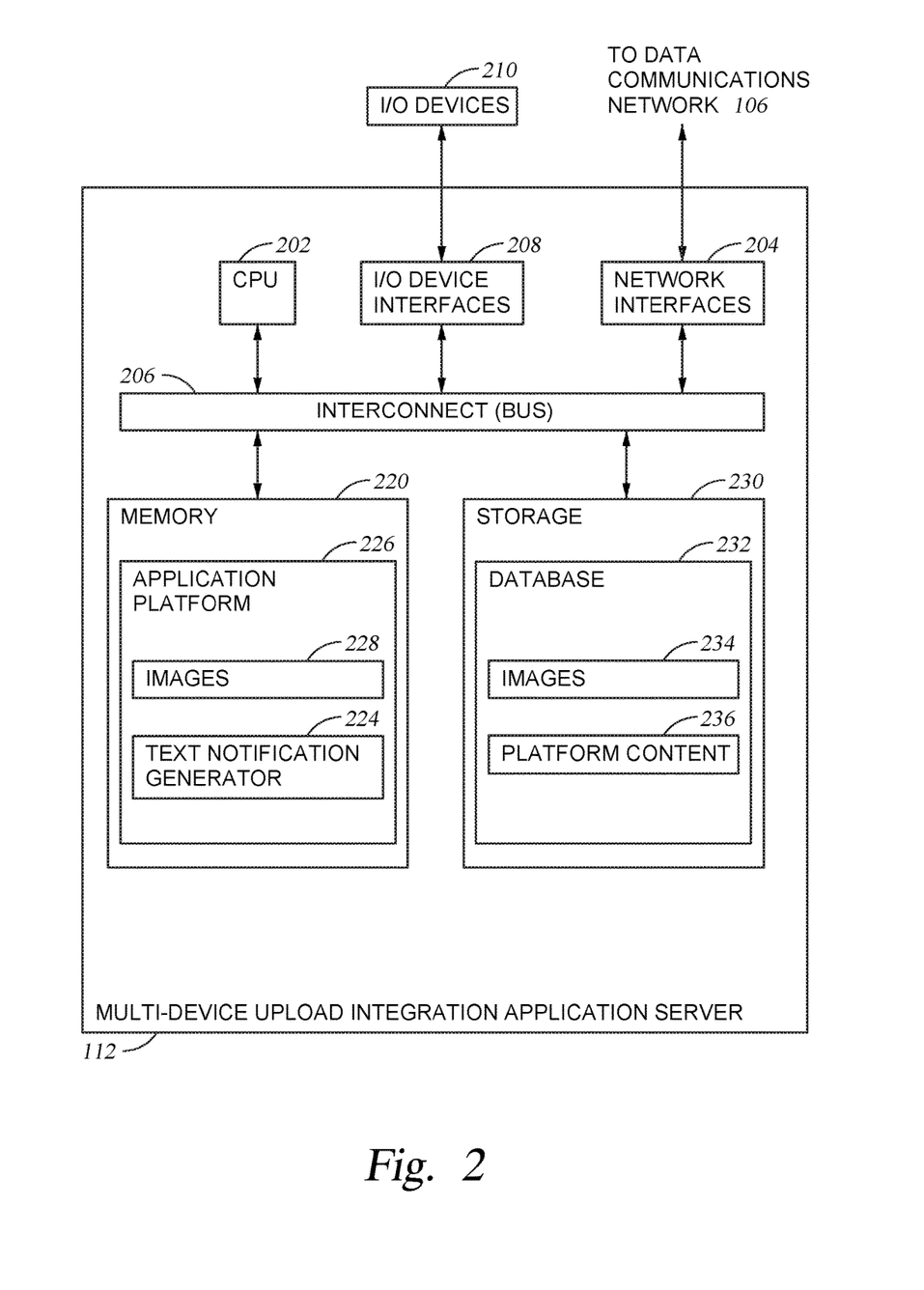
FIG. 2 illustrates a more detailed view of a server of FIG. 1, according to embodiments described herein.

FIG. 2 illustrates a more detailed view of the multi-device upload integration application server 112 of FIG. 1. The multi-device upload integration application server 112 includes, without limitation, a central processing unit (CPU) 202, a network interface 204, memory 220, and storage 230 communicating via an interconnect 206. The multi-device upload integration application server 112 may also include I/O device interfaces 208 connecting I/O devices 210 (for example, keyboard, video, mouse, audio, touchscreen, etc.). The multi-device upload integration application server 112 may further include the network interface 204 configured to transmit data via the communications network 106.

The CPU 202 retrieves and executes programming instructions stored in the memory 220 and generally controls and coordinates operations of other system components. Similarly, the CPU 202 stores and retrieves application data residing in the memory 220. The CPU 202 is included to be representative of a single CPU, multiple CPU's, a single CPU having multiple processing cores, and the like. The interconnect 206 is used to transmit programming instructions and application data between the CPU 202, I/O device interfaces 208, storage 230, network interfaces 204, and memory 220.

The memory 220 is generally included to be representative of a random access memory and, in operation, stores software applications and data for use by the CPU 202. Although shown as a single unit, the storage 230 may be a combination of fixed and/or removable storage devices, such as fixed disk drives, floppy disk drives, hard disk drives, flash memory storage drives, tape drives, removable memory cards, CD-ROM, DVD-ROM, Blu-Ray, HD-DVD, optical storage, network attached storage (NAS), cloud storage, or a storage area-network (SAN) configured to store non-volatile data.

The memory 220 may store instructions and logic for executing an application platform 226 which may include images 228. The application platform 226 may be a non-transitory computer-readable medium. In some embodiments, the memory 220 may execute the text notification generator 224. The text notification generator 224 may be operated by the multi-device upload integration application server 112. The application platform 226 running the multi-device upload integration application may cause the text notification generator 224 to generate a notification and/or send the notification to a second graphical user interface 420. The storage 230 may store images 234 and other user generated media and may include a database 232 configured to store images 234 associated with application platform content 236. The database 232 may also store application content relating to data associated with user generated media or images and other application features for providing the user with an application platform that displays images 234. The database 232 may be any type of storage device.

Network computers are another type of computer system that can be used in conjunction with the disclosures provided herein. Network computers do not usually include a hard disk or other mass storage, and the executable programs are loaded from a network connection into the memory 220 for execution by the CPU 202. A web TV system is also considered to be a computer system, but it may lack some of the features shown in FIG. 2, such as certain input or output devices. A typical computer system will usually include at least a processor, memory, and an interconnect coupling the memory to the processor.

Figure 3:
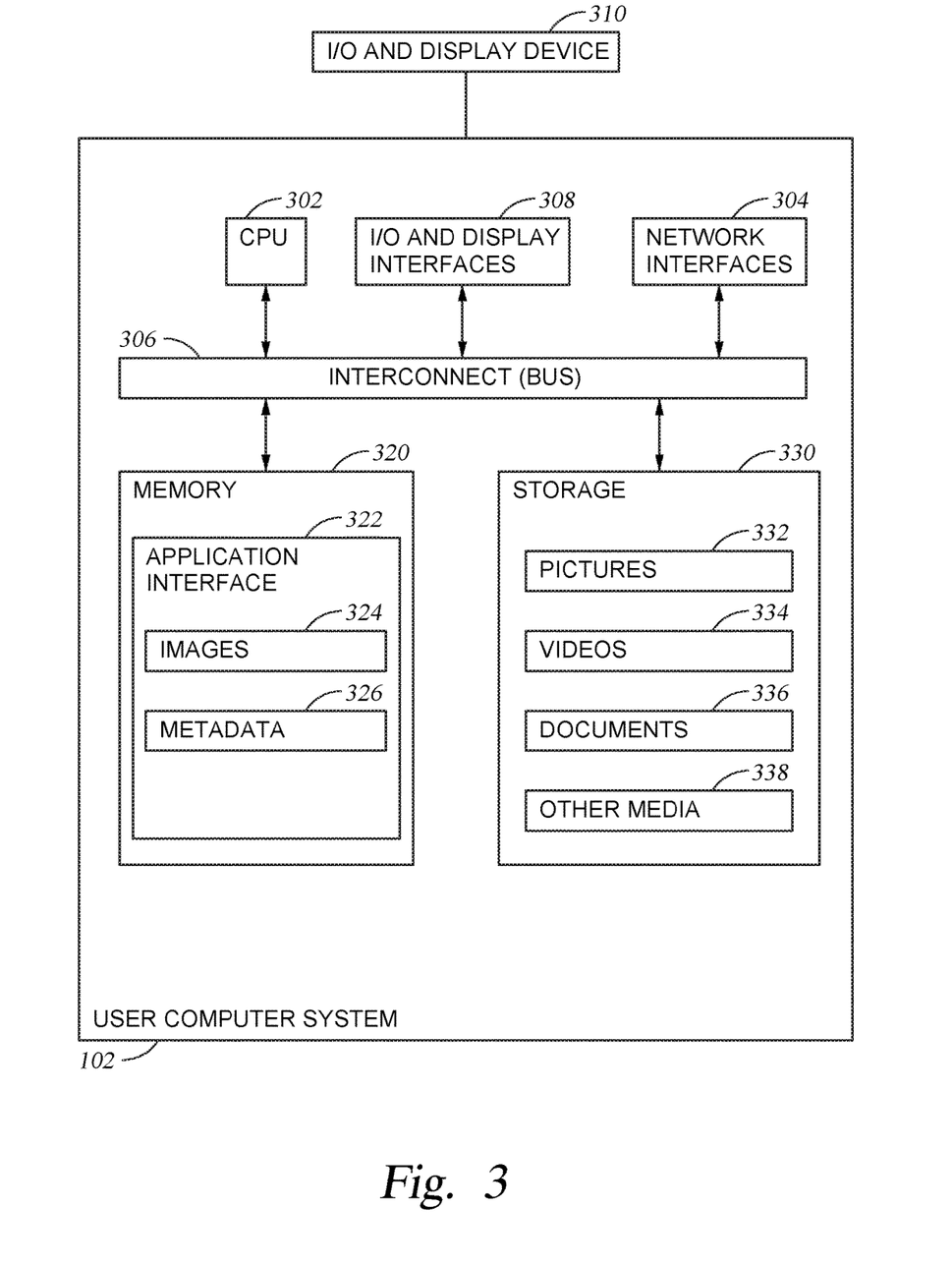
FIG. 3 illustrates a user computing system used to access a website and utilize the multi-device upload integration application, according to embodiments described herein.

FIG. 3 illustrates a user computer 102 used to access the application platform 226 running the multi-device upload integration application and display images associated with the application platform 226. The user computer 102 may include, without limitation, a central processing unit (CPU) 302, a network interface 304, an interconnect 306, a memory 320, and storage 330. The user computer 102 may also include an I/O device interface 308 connecting I/O devices 310 (for example, keyboard, display, touchscreen, and mouse devices) to the user computer 102.

Like CPU 202, CPU 302 is included to be representative of a single CPU, multiple CPU's, a single CPU having multiple processing cores, etc., and the memory 320 is generally included to be representative of a random access memory. The interconnect 306 may be used to transmit programming instructions and application data between the CPU 302, I/O device interfaces 308, storage 330, network interface 304, and memory 320. The network interface 304 may be configured to transmit data via the communications network 106, for example, to stream, upload/download or otherwise access content from the multi-device upload integration application server 112. Storage 330, such as a hard disk drive or solid-state storage drive (SSD), may store non-volatile data. The storage 330 may contain pictures 332, videos 334, documents 336, and other media 338. Illustratively, the memory 320 may include an application interface 322, which itself may display images 324, and/or store metadata 326 of images 324. The application interface 322 may provide one or more software applications which allow the user to access media items and other content hosted by the application platform 226 running the multi-device upload integration application. In one embodiment, the application interface 322 may be configured to receive electronic communication, such as a text message, from the text notification generator 224 of the multi-device upload integration application server 112.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present example also relates to an apparatus for performing the operations herein. This apparatus may be specially constructed for the illustrated purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system interconnect.

The structure for a variety of these systems will appear from the description above. In addition, the present examples are not described with reference to any particular programming language, and various examples may thus be implemented using a variety of programming languages.

As described in greater detail herein, embodiments of the disclosure provide a software application through which a user may access a first file storage location, such as a personal web page hosted by a server, on a remote device by a link accessed via a second graphical user interface. The user may upload and/or transfer media items from a second file storage location accessed via the second graphical user interface to the first file storage location. The link may allow a user to send a link via a data network that will allow the user to quickly log in and upload media items from the remote device which accesses the link. As such, the media items accessible by the remote device may be transferred from the second storage location of the remote device to the first storage location.

FIGS. 4A, 4B, 4D, and 4E, respectively, are conceptual diagrams illustrating a server 400 accessed via a first graphical user interface 402. The server 400 may be a computer system. The computer system may include a processor and a memory, discussed supra. The memory may store instructions that, when executed by the processor, cause the computer system to perform the functions described herein. The server 400 may run applications and programs, such as an internet browser. In certain embodiments, the server 400 may run the application platform 226 running the multi-device upload integration application, as discussed supra. The server 400 may comprise a first file storage location 404. It is contemplated that the first file storage location 404 is a remote server. By way of example only, and not intended to be limiting, the first file storage location 404 may store digital photos hosted by a photo gallery website which is accessible to users via the internet.

Figure 4A:
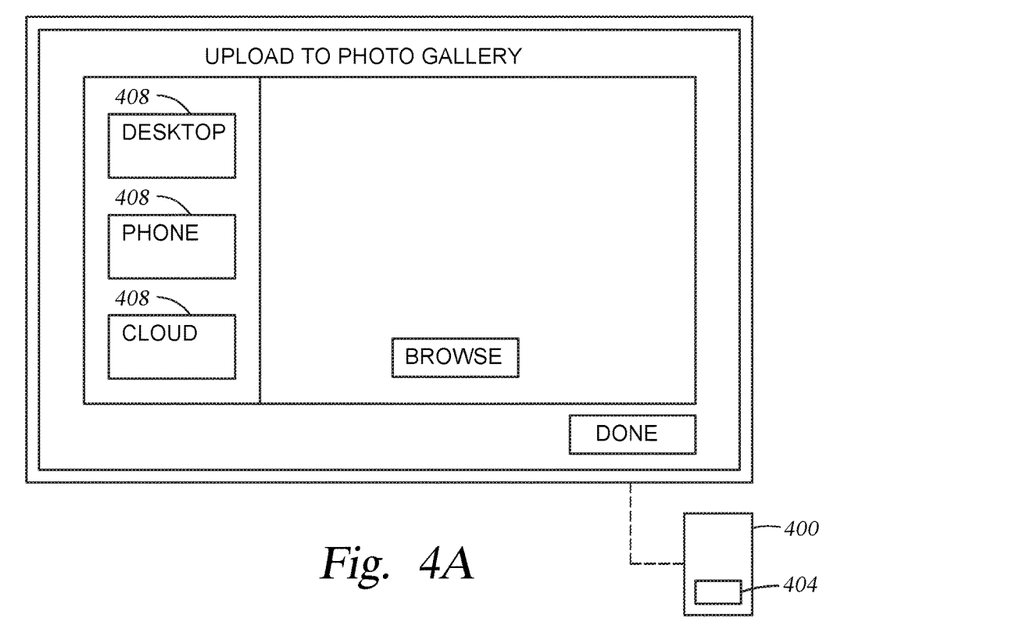
FIG. 4A illustrates a first conceptual diagram of a server receiving a request via a first graphical user interface to access a first file location, according to embodiments described herein.

FIG. 4A illustrates a first conceptual diagram of a server 400 receiving a request via a first graphical user interface 402 to access a first file storage location 404, according to embodiments described herein. In the embodiment illustrated in FIG. 4A, a user may access and view an application, such as a website, hosted by the server 400 which includes the application platform 226 running the multi-device upload integration application, hosted by the multi-device upload integration application server 112, via the first graphical user interface 402. In some embodiments, the first graphical user interface 402 may be a personal computer or laptop computer. After accessing the website, the user may navigate to and/or open an uploader page 406 which may allow the user to add media items to the first file storage location 404. In certain embodiments, the uploader page 406 may allow the user to select where the media items are to be retrieved from, via at least one selectable button 408 located within the uploader page 406. Generally, the selectable button 408 may be one or more graphical control elements configured to receive input from the user. By way of example only, the uploader page 406 may allow the user to select media items stored in a memory of a smart phone, stored in a memory of another personal computer, and/or stored in a remote storage location such, as a cloud storage location. The server 400 may receive a request via the first graphical user interface 402 to access the first file storage location via a second graphical user interface 420 (See, FIG. 5A, infra). The request may be received when at least one of the selectable buttons 408 displayed on the uploader page 406 are selected by the user. The second graphical user interface 420 may be, but is not limited to, a smart phone, a personal computer, a tablet, a personal digital assistant, an internet connected television, a mobile device, and/or a similar electronic device.

Figure 4B:
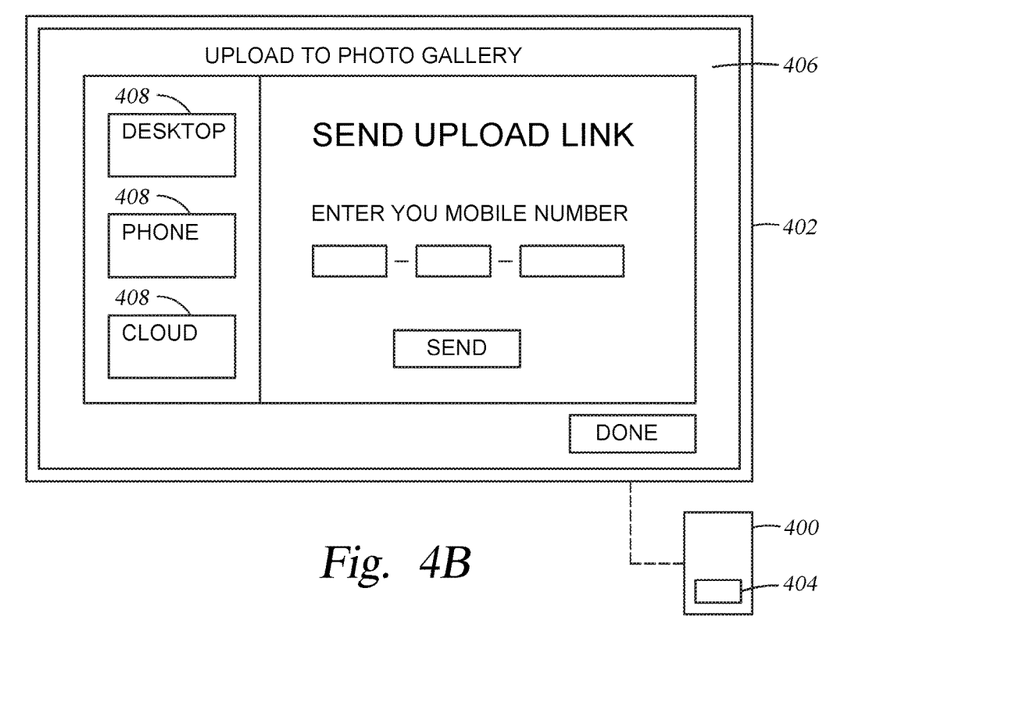
FIG. 4B illustrates a second conceptual diagram of the server receiving an input via the first graphical user interface, according to embodiments described herein.

FIG. 4B illustrates a second conceptual diagram of the server 400 receiving an input via the first graphical user interface 402, according to embodiments described herein. As shown, the user may be prompted via the first graphical user interface 402 to enter an input. The input may allow the server 400 to determine where the media item to be added to the first file storage location 404 is currently stored. In the embodiment of FIG. 4B, the user may have selected to upload a media item from a smart phone by selecting the selectable button 408 entitled "phone." As such, the server 400, via the first graphical user interface 402, prompts the user to enter an input, such as a phone number. The server 400 receives the input via the first graphical user interface 402. The input determines a unique identification protocol associated with the second graphical user interface 420, discussed infra. In some embodiments, the second graphical user interface 420 may be a screen on a smart phone.

Figure 4C:
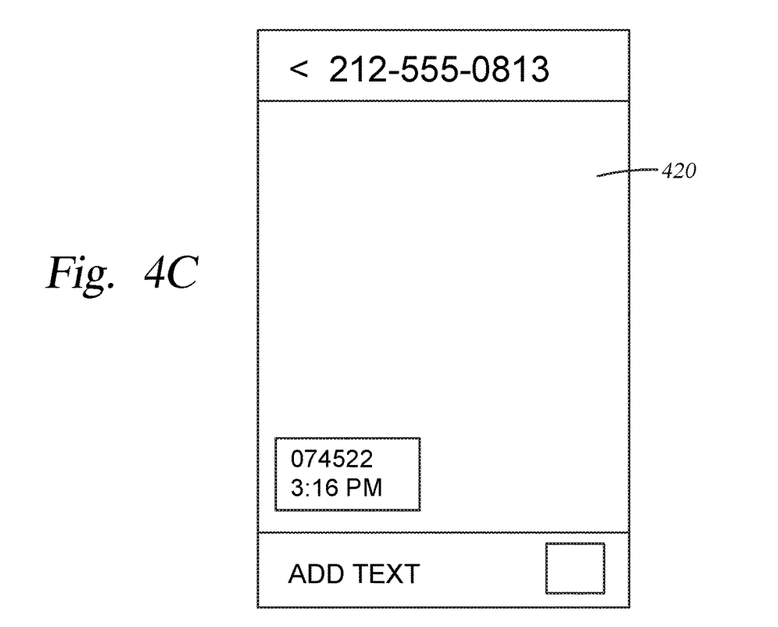
FIG. 4C illustrates a third conceptual diagram of an embodiment in which the authenticity of a second graphical user interface is verified, according to embodiments described herein.

FIG. 4C illustrates a third conceptual diagram of an embodiment in which the authenticity of a second graphical user interface is verified. Determining the unique identification protocol may include verifying the authenticity of the second graphical user interface 420 associated with the input. Furthermore, a usage history of the second graphical user interface 420 associated with the input may be determined. If the second graphical user interface 420 has an unknown usage history, i.e., the second graphical user interface 420 is a new second graphical user interface 420 and/or is a second graphical user interface 420 that has not been previously utilized in connection with the server 400, then a unique identification code may be generated by the server 400 and sent to the second graphical user interface

420. The unique identification code may be used to verify and/or authenticate the second graphical user interface 420 and/or determine an ownership of the second graphical user interface 420. The unique identification code may be displayed on the second graphical user interface 420.

As shown in FIG. 4C, a verification code has been sent from the server 400 to the second graphical user interface 420, based on the input received by the server 400 from the first graphical user interface 402. By way of example only, and not intended to be limiting, the user may enter a phone number to a smart phone as the input to the server 400 on the first graphical user interface 402, such as a personal computer. The server 400 may verify the authenticity of the second graphical user interface 420 by determining that the second graphical user interface 420 is a smart phone which utilizes the input (e.g., phone number) received. The server 400 may determine the usage history of the smart phone by determining whether the smart phone has been previously utilized by the server and/or if the user has previously connected the smart phone to the server based on the phone number input.

If the input phone number and/or smart phone have not previously been utilized with the server 400 then the server may generate and send a verification code to the smart phone by, for example, short message service, text message, or email. The verification code may allow the server 400 to ensure that the input phone number belongs to the user. The verification code, once sent, is displayed to the user on the second graphical user interface 420, i.e., the smart phone screen, as shown in FIG. 4C.

Figure 4D:
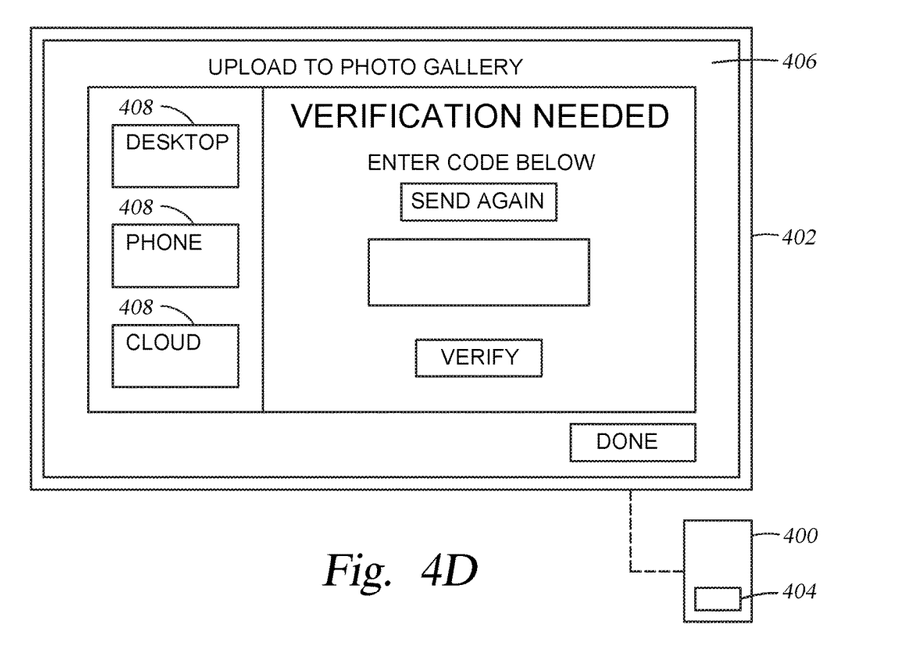
FIG. 4D illustrates a fourth conceptual diagram of an embodiment in which the authenticity of the second graphical user interface is further verified, according to embodiments described herein.

FIG. 4D illustrates a fourth conceptual diagram of an embodiment in which the authenticity of the second graphical user interface is further verified. The user may enter the verification code on the server 400 via the first graphical user interface 402, as shown in FIG. 4D. As such, the server 400 may receive the unique identification code. The server 400 may authenticate the unique identification code entered by the user by comparing the unique identification code sent by the server 400 to the second graphical user interface 420 and/or smart phone to the unique identification code entered by the user on the server 400 via the first graphical user interface 402. If the comparison determines that the unique identification codes match the server 400 may permission the second graphical user interface 420. Once the second graphical user interface 420 is permissioned, the server may remember and/or store the permission such that the second graphical user interface 420 may not require a subsequent permissioning.

Figure 4E:
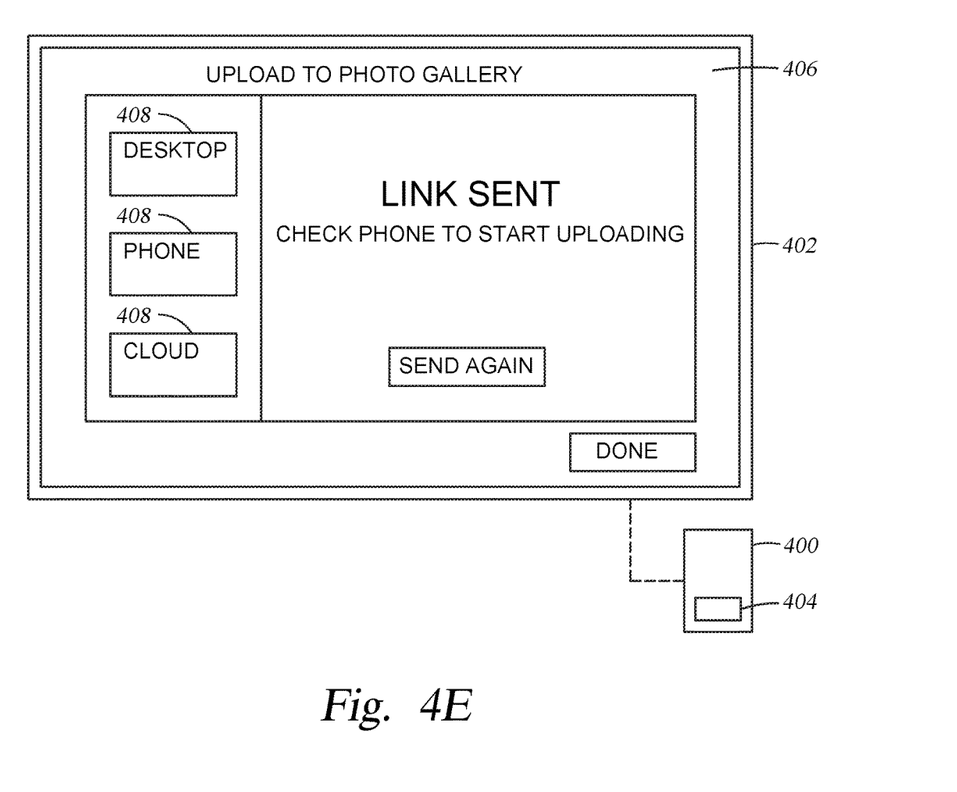
FIG. 4E illustrates a fifth conceptual diagram of a link to the first file location generated, according to embodiments described herein.

FIG. 4E illustrates a fifth conceptual diagram of a link generated to the first file storage location 404, according to embodiments described herein. In some embodiments, the server 400 may generate a link to the first file storage location 404. Furthermore, the link may be sent to the second graphical user interface 420 via a data network according to the input received. In some embodiments, the link may be a uniform resource locator. In some embodiments, the data network may be a short message service (SMS), such as a text message. As shown in FIG. 4E, the server may further generate a message to be displayed on the first graphical user interface 402 which indicates the status of the link, for example, that the link has be successfully sent.

It is contemplated that in certain embodiments, the unique identification code may be a one-time use unique identification code, a multi-use unique identification code, and/or a unique identification code valid for a predetermined time period. The time period associated with the unique identification code may be limited to a predetermined time, for example, 24 hours, or the time period may be unlimited. It is further contemplated that, in certain embodiments, the link may be a one-time use link, a multi-use link, and/or a link valid for a predetermined time period. The time period associated with the link may be limited to a predetermined time, for example, 24 hours, or the time period may be unlimited.

Figure 5A:
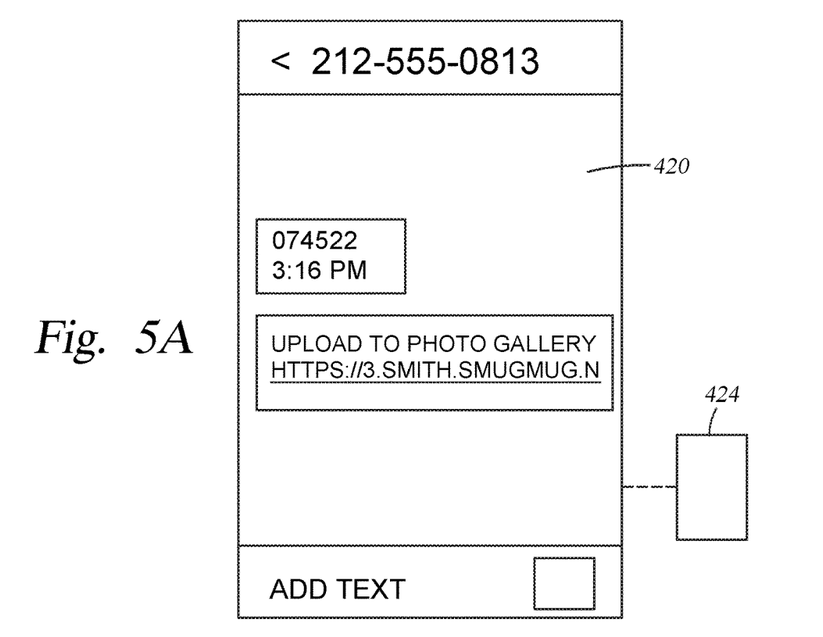
FIG. 5A illustrates a first conceptual diagram of link displayed on a second graphical user interface, according to embodiments described herein.

FIG. 5A illustrates a first conceptual diagram of the generated link to the first file storage location 404 as displayed on the second graphical user interface 420, according to embodiments described herein. In some embodiments, the link may be a uniform resource locator. The link may display information to the user on the second graphical user interface 420, such as the title of the first file storage location 404, the purpose of the link, and/or instructions on how to use the link. The link may be received by the user as a short message service (SMS) message, such as a text message. The user may open the link by selecting the link, clicking on the link, copy and pasting the link into a web browser, following the instructions of the link, or the like. In some embodiments, selecting the link may open a web browsing application and direct the web browsing application to a specific webpage.

In an optional embodiment, if the link to the first file storage location 404 is nonfunctioning, the second graphical user interface 420 may display an error message indicating that the link is nonfunctioning, that access to the first file storage location 404 is denied, or any other message indicating a failure to resolve the link.

Figure 5B:
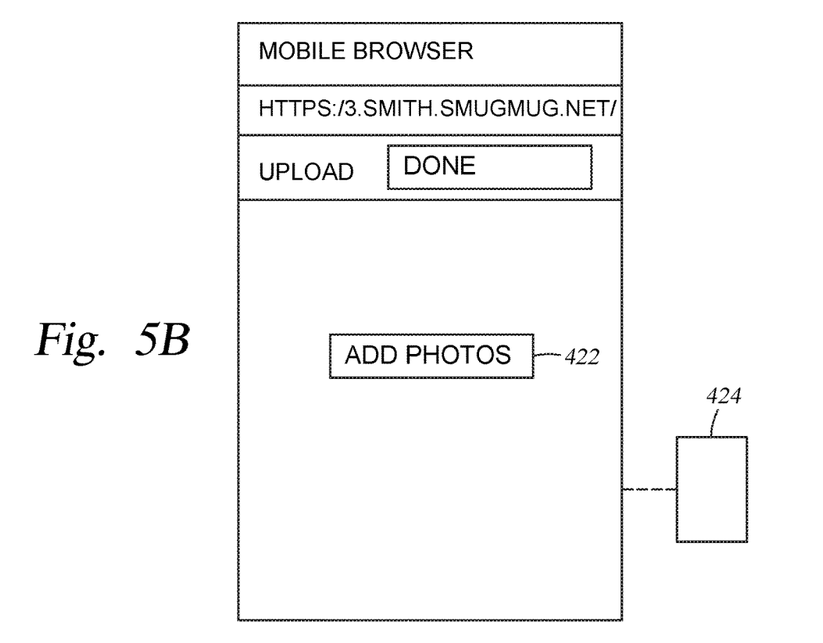
FIG. 5B illustrates a second conceptual diagram of an embodiment of the second graphical user interface launching an internet connected web browser application automatically to the first file storage location, according to embodiments described herein.

FIG. 5B illustrates a second conceptual diagram of an embodiment of the second graphical user interface 420 automatically launching an internet connected web browser application and redirecting the web browser application to a web page connected with the first file storage location 404, according to one embodiment described herein. As such, when the link is selected via the second graphical user interface 420, the link will automatically authenticate as the user when launching the web browser application and may cause the web browser application to navigate the internet connected web browser application to a predetermined web page. The internet connected web browser application may be navigated automatically to the first file storage location 404, i.e., the predetermined web page.

The server 400 may receive a request to access the first file storage location 404 via the link displayed on the second graphical user interface 420. The uploader page 406 may be launched within the web browser application such that the user may upload media items stored in a second file storage location 424. In some embodiments, the second file storage location 424 may be a local memory associated with the second graphical user interface 420, such as a memory coupled with the second graphical user interface 420, for example a smart phone memory. In other embodiments, the second file storage location 424 may be a remote memory accessed via an internet connection. The remote memory may be a cloud based storage location, a storage location located on a remote server, an external storage location, or the like.

The first file storage location 404 may be displayed on the second graphical user interface 420. Once the web browser application has navigated to the predetermined web page, a plurality of options 422 may be displayed on the second graphical user interface 420 which may allow the user to add media items from the second file storage location 424 to the first file storage location 404. In some embodiments, an option 422 may be displayed to "add media items" or "add photos." The user may select the desired option 422 to add media items. By selecting the appropriate option 422, media items may be selected to be uploaded from the second file storage location 424 to the first file storage location 404.

Figure 5C:
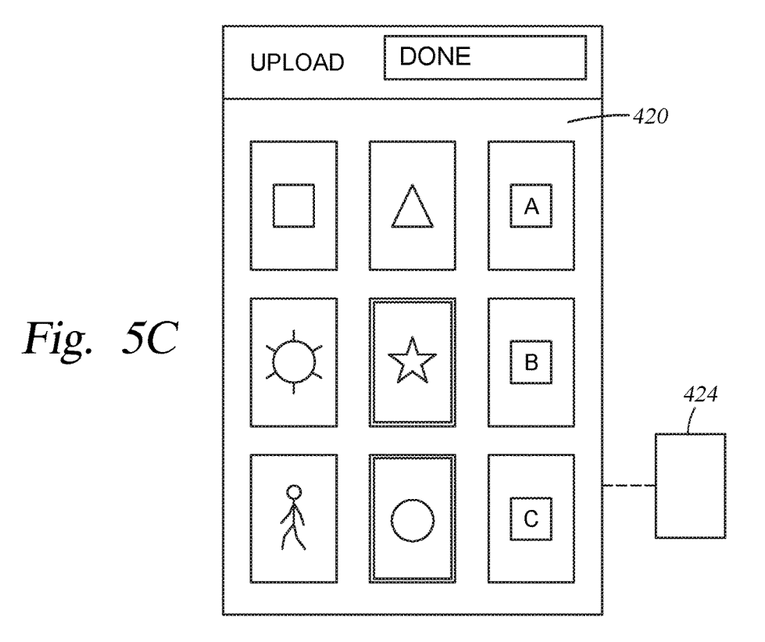
FIG. 5C illustrates a third conceptual diagram of media items in the second file storage location selected for upload to the first file storage location via the second graphical user interface, according to embodiments described herein.

FIG. 5C illustrates a third conceptual diagram of media items in the second file storage location 424 selected for upload to the first file storage location 404 via the second graphical user interface 420, according to one embodiment described. As shown in FIG. 5C, two media items have been selected via the second graphical user interface 420 for upload and transfer from the second file storage location 424 to the first file storage location 404. Indication of selected media items may be visually represented in a variety of manners. For example, shading, highlighting, or any other suitable visual selection indicator may be generated to indicate which of the media items displayed on the second graphical user interface 420 have been selected.

Once desired media items are selected to be uploaded, the media items may be transferred from the second file storage location 424 accessed via the second graphical user interface 420 to the first file storage location 404. The media items stored within the first file storage location 404 may be displayed. The displaying may be performed on the first graphical user interface 402 and/or the second graphical user interface 420.

Figure 6:
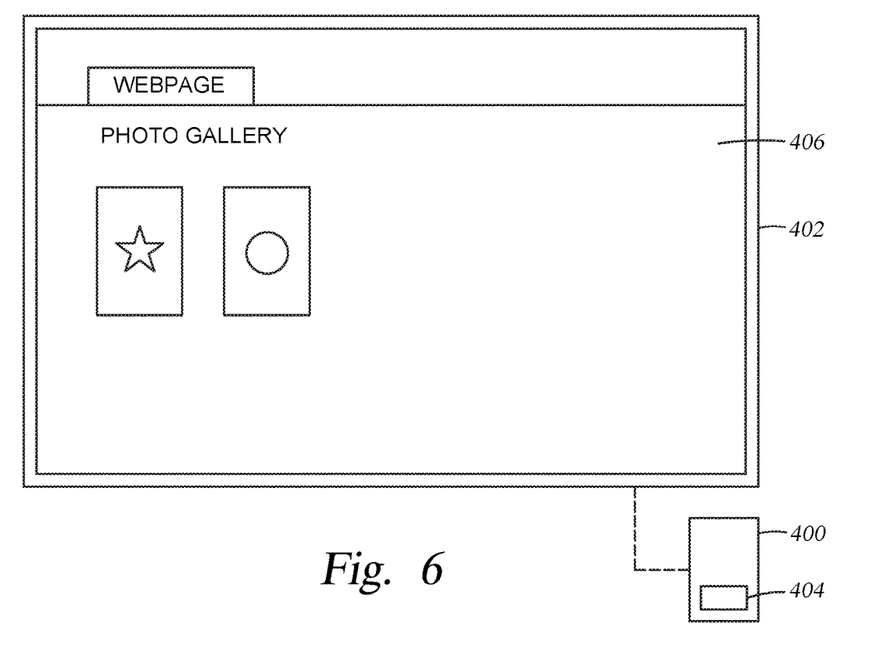
FIG. 6 illustrates a conceptual diagram of displaying the media item stored within the first file storage location, according to embodiments described herein.

FIG. 6 illustrates a conceptual diagram of displaying the media item stored within the first file storage location, according to one embodiment described herein. As shown in FIG. 6, the media items selected in FIG. 5C for upload and transfer from the second file storage location 424 to the first file storage location 404 are stored in the second file storage location 424 and displayed on the first graphical user interface 402.

Additional embodiments are contemplated. For example, the first file storage location 404 may be a cloud based storage location hosted by a storage website. The storage website may require the user to have, maintain, and/or create an account with the storage website. As such, additional embodiments may include the server 400 generating and sending the link to the first file storage location 404 via the data network during the initial creation of the account with the storage website. As such, the user may be required to upload and/or transfer at least one media item to the account upon creation.

Figure 7:
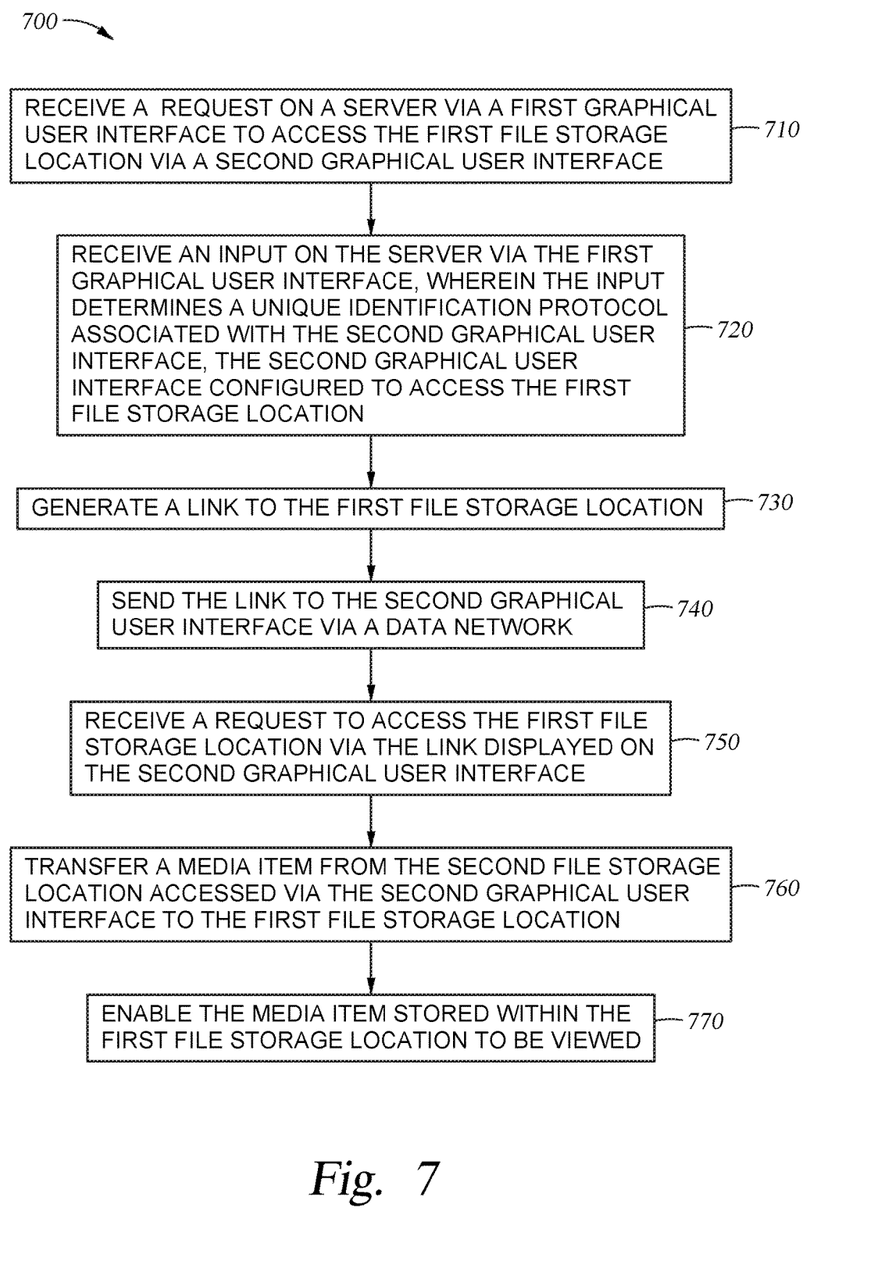
FIG. 7 schematically illustrates operations of a method for generating and delivering access to a first file storage location from multiple devices, according to embodiments described herein.

FIG. 7 schematically illustrates operations of a method 700 for generating and delivering access to a first file storage location from multiple devices according to one embodiment described herein. The method 700 generally relates to embodiments wherein digital photos are stored on a mobile device (i.e., second graphical user interface 420), for example a smart phone, and the user desires that the digital photos to be uploaded to an online photo gallery. As such, the mobile device may receive a link that allows the user to transfer and/or upload photos stored remotely on the mobile device to the first storage location without needing to physically connect the mobile device directly to the first storage location via a hard-wired connection. The link may allow the user to directly access the first file storage location without requiring the user to log-in or navigate to the appropriate location via a webpage.

At operation 710, a request may be received on a server via a first graphical user interface to access the first file storage location via a second graphical user interface. At operation 720, an input may be received on the server via the first graphical user interface. The input may be a telephone number or other mobile device identification convention. The input determines a unique identification protocol associated with the second graphical user interface. The second graphical user interface is configured to access the first file storage location. Optionally, in some embodiments, determining the unique identification protocol may include verifying the authenticity of the second graphical user interface associated with the input, and determining a usage history of the second graphical user interface associated with the input. The usage history may include a determination of the account status as a preexisting account, the number megabytes of data stored at the first file storage location 404, login history, among other things. If the second graphical user interface has an unknown usage history, a unique identification code may be generated, sent to, and displayed on the second graphical user interface. The unique identification code may be received and authenticated, and the second graphical user interface may be subsequently permissioned to provide access to the first file storage location.

At operation 730, a link to the first file storage location is generated. The link may be a uniform resource locator or other web resource which specifies a specific location on a computer or data network. At operation 740, the link is sent the second graphical user interface via a data network. The data network may be a short message service (SMS). At operation 750, a request to access the first file storage location via the link displayed on the second graphical user interface is received. The link may, when selected, directly navigate the user to the first file storage location and, furthermore, may not require the user to log-in or verify their identity. In one embodiment, the link may navigate to a gallery page associated with the user. For example, the gallery page may be a user's website hosted by the first file storage location (i.e., on a server).

At operation 760, a media item is transferred from a second file location accessed via the second graphical user interface to the first file storage location. The second file storage location may be a local memory associated with the second graphical user interface or a remote memory accessed via an internet connection. The remote memory may be cloud-based storage. Optionally, in some embodiments, an internet connected web browsing application may be launched on the second graphical user interface, the internet connected web browsing application may be automatically navigated to the first file storage location, and/or the first file storage location may be displayed on the second graphical user interface.

At operation 770, the media item stored within the first file storage location is enabled for viewing. The viewing may be performed on the first graphical user interface or the second graphical user interface. Accordingly, the user realizes improved convenience and efficiency when viewing the media items stored on the first file storage location.

The application platform 226 running the multi-device upload integration application allows for the generation, deliverance, and transfer of media items, such as electronic files, to a first file storage location from multiple remote file storage locations without a physical connection to the first file storage location via a link. As such, the media items may be uploaded from the remote second file location via an internet connection such that the remote device with which the media items are stored is wirelessly coupled to the first file storage location. Additional benefits include that the user may send a link via a data network that allows the user to quickly log in and upload media items via the remote device which receives the link. Each link may authenticate the user and launch the correct application on the remote device for uploading the media items after the link is selected. The user may upload media items via the remote device to the first file location via the link. Furthermore, any number of devices may securely transfer media items to the first file storage location without requiring the logging in or credentialing of the user as a result of a preauthentication of the link. Furthermore, the multi-device upload integration application removes the requirements of navigating to the appropriate first file storage location as the first file storage location has been predetermined.

EXAMPLE

The following is for purposes of illustration only, and is in no way intended to be limiting. As such, the embodiments described below provide an example for the use of the multi-device upload integration application disclosed supra.

In some embodiments the user may be a photographer. The photographer may maintain the first file storage location 404, which, in certain embodiments, may be a photo storage website or an online photo gallery. The photo gallery may be accessible to the photographer via a secure webpage such that the photographer logs into the photo gallery. The photo gallery may provide the photographer with the option to upload photos to certain photo galleries for display. In order to upload photos to a specific photo gallery, the photographer may navigate to the photo gallery and select an option to upload photos. However, the desired photos may be located on various memory sources, such as a smart phone, a tablet, the cloud, a local memory, etc. As such, the photographer can choose the source for which the desired photos are currently stored.

In this example, the photographer may desire to upload photos from a smart phone to the online photo gallery. As such, the photographer may select the selectable button from the uploader page. The photographer may be prompted to enter a phone number associated with the smart phone. If the phone number entered is a new phone number, e.g., it has not previously been submitted to the online photo gallery webpage, a verification code may be sent via short message service to the smart phone. The verification code may also be submitted to the photo storage website. At the same time the verification code is sent, an interface may be populated for entering the code, such that photo storage webpage can verify the authenticity of the code. If the correct verification code is submitted, a link may be sent via short message service to the smart phone. The link may navigate the photographer directly to the photo gallery of the secure webpage which the link was generated from.

When the link is selected, the link may authenticate as the photographer, navigate to the appropriate photo gallery, and launch the uploader in a mobile browser on the smart phone. As such, the photographer may select and upload the desired photos from the smart phone memory directly to the desired photo gallery.

While the foregoing is directed to embodiments described herein, other and further embodiments may be devised without departing from the basic scope thereof. For example, aspects of the present disclosure may be implemented in hardware or software or in a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (for example, read-only memory devices within a computer such as CD-ROM disks readable by a CD-ROM drive, flash memory, ROM chips or any type of solid-state non-volatile semiconductor memory) on which information is permanently stored; and (ii) writable storage media (for example, floppy disks within a diskette drive or hard-disk drive or any type of solid-state random-access semiconductor memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A method for generating and delivering access to a file storage location from multiple devices, the method sequentially comprising:

receiving a request on a server via a first graphical user interface to access a first file storage location of a media gallery page via a second graphical user interface;

receiving a first input on the server via the first graphical user interface, the first input determining a unique identification protocol associated with the second graphical user interface, the second graphical user interface configured to access the first file storage location of the media gallery page, wherein the determining a unique identification protocol comprises:

determining a usage history of the second graphical user interface associated with the input, the second graphical user interface having an unknown usage history;

generating and sending a unique identification code through the server for display at the second graphical user interface;

receiving a second input comprising the unique identification code via the first graphical user interface; and authenticating the unique identification code;

generating a link to the first file storage location of the media gallery page in response to authenticating the unique identification code;

sending the link to the second graphical user interface via a data network;

receiving a request to access the first file storage location of the media gallery page displayed on the second graphical user interface;

launching an internet connected web browser application on the second graphical user interface;

navigating the internet connected web browser application automatically to the first file storage location of the media gallery page;

displaying the first file storage location of the media gallery page on the second graphical user interface;

transferring a media item from a second file storage location accessed via the second graphical user interface to the first file storage location of the media gallery page; and enabling the media item stored within the first file storage location of the media gallery page to be viewed on the media gallery page.

2. The method of claim 1, wherein the link is a uniform resource locator.

3. The method of claim 1, wherein the second file storage location is local memory associated with the second graphical user interface or is remote memory accessed via an internet connection.

4. The method of claim 1, wherein the first input is a telephone number and the data network is a short message service.

5. The method of claim 1, wherein the enabling allows the media item stored within the first file location of the media gallery page to be viewed on the first graphical user interface or the second graphical user interface.

6. The method of claim 1, wherein the first file storage location of the media gallery page is displayed on the second graphical user interface via a file uploader page.

7. A computer system for generating and delivering access to a file storage location from multiple devices, comprising:
 a processor; and
 a memory storing instructions that, when executed by the processor, sequentially cause the computer system to:
  receive a request on a server via a first graphical user interface to access a first file storage location of a media gallery page via a second graphical user interface;
  receive first input on the server via the first graphical user interface, the first input determining a unique identification protocol associated with the second graphical user interface, the second graphical user interface configured to access the first file storage location of the media gallery page, wherein the determining a unique identification protocol includes:
   determining a usage history of the second graphical user interface associated with the input, the second graphical user interface having an unknown usage history;
   generating and sending a unique identification code through the server for display at the second graphical user interface;
   receive a second input comprising the unique identification code via the first graphical user interface; and
  authenticate the unique identification code;
  generate a link to the first file storage location of the media gallery page in response to authenticating the unique identification code;
  send the link to the second graphical user interface via a data network;
  receive a request to access the first file storage location of the media gallery page via the link displayed on the second graphical user interface;
  launch an internet connected web browser application on the second graphical user interface;
  navigate the internet connected web browser application automatically to the first file storage location of the media gallery page;
  display the first file storage location of the media gallery page on the second graphical user interface;
  transfer a media item from a second file storage location accessed via the second graphical user interface to the first file storage location of the media gallery page; and
  enable the media item stored within the first file storage location of the media gallery page to be viewed on the media gallery page.

8. The computer system of claim 7, wherein the link is a uniform resource locator.

9. The computer system of claim 7, wherein the second file storage location is local memory associated with the second graphical user interface or is remote memory accessed via an internet connection.

10. The computer system of claim 7, wherein the first input is a telephone number and the data network is a short message service.

11. The computer system of claim 7, wherein the enabling allows the media item stored within the first file location of the media gallery page to be viewed on the first graphical user interface or the second graphical user interface.

12. The computer system of claim 7, wherein the first file storage location of the media gallery page is displayed on the second graphical user interface via a file uploader page.

13. A non-transitory computer-readable medium storing instructions that, when executed by a processor, cause a computer system to generate and deliver access to a file storage location from multiple devices, by sequentially performing the steps of:
 receiving a request on a server via a first graphical user interface to access a first file storage location of a media gallery page via a second graphical user interface;
 receiving a first input on the server via the first graphical user interface, the first input determining a unique identification protocol associated with the second graphical user interface, the second graphical user interface configured to access the first file storage location of the media gallery page, wherein the determining a unique identification protocol includes:
  determining a usage history of the second graphical user interface associated with the input, the second graphical user interface having an unknown usage history;
  generating and sending a unique identification code through the server for display at the second graphical user interface;
  receiving a second input comprising the unique identification code via the first graphical user interface; and
  authenticating the unique identification code
 generating a link to the first file storage location of the media gallery page in response to authenticating the unique identification code;
 sending the link to the second graphical user interface via a data network;
 receiving a request to access the first file storage location of the media gallery page via the link displayed on the second graphical user interface;
 launching an internet connected web browser application on the second graphical user interface;
 navigating the internet connected web browser application automatically to the first file storage location of the media gallery page;
 displaying the first file storage location of the media gallery page on the second graphical user interface;
 transferring a media item from a second file storage location accessed via the second graphical user interface to the first file storage location of the media gallery page; and
 enabling the media item stored within the first file storage location of the media gallery page to be viewed on the media gallery page.

14. The non-transitory computer-readable medium of claim 13, wherein the link is a uniform resource locator.

15. The non-transitory computer-readable medium of claim 13, wherein the second file storage location is local memory associated with the second graphical user interface or is remote memory accessed via an internet connection.

16. The non-transitory computer-readable medium of claim 13, wherein the first input is a telephone number and the data network is a short message service.

17. The non-transitory computer-readable medium of claim 13, wherein the enabling allows the media item stored within the first file location of the media gallery page to be viewed on the first graphical user interface or the second graphical user interface.

18. The non-transitory computer-readable medium of claim 13, wherein the first file storage location of the media gallery page is displayed on the second graphical user interface via a file uploader page.

* * * * *